(12) United States Patent
Mutalik et al.

(10) Patent No.: US 11,301,780 B2
(45) Date of Patent: Apr. 12, 2022

(54) METHOD AND ELECTRONIC DEVICE FOR MACHINE LEARNING BASED PREDICTION OF SUBSEQUENT USER INTERFACE LAYOUTS

(71) Applicant: SAMSUNG ELECTRONICS CO., LTD., Suwon-si (KR)

(72) Inventors: Sripurna Mutalik, Bangalore (IN); Nidhal Kottamoola Ibrahimkutty, Bangalore (IN); Naresh Kumar Narasimma Moorthy, Bangalore (IN); Manith Shetty, Bangalore (IN); Anuradha Kanukotla, Bangalore (IN); Jaeho Kim, Suwon-si (KR); Kwanjin Jung, Suwon-si (KR); Wonseo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 93 days.

(21) Appl. No.: 16/791,111

(22) Filed: Feb. 14, 2020

(65) Prior Publication Data

US 2020/0265337 A1    Aug. 20, 2020

(30) Foreign Application Priority Data

Feb. 15, 2019  (IN) .............................. 201941006132
Dec. 6, 2019   (IN) .............................. 201941006132

(51) Int. Cl.
*G06N 20/00*   (2019.01)
*G06F 3/0482*  (2013.01)
(Continued)

(52) U.S. Cl.
CPC ........... *G06N 20/00* (2019.01); *G06F 3/0482* (2013.01); *G06F 11/34* (2013.01); *G06F 16/908* (2019.01)

(58) Field of Classification Search
None
See application file for complete search history.

(56) References Cited

U.S. PATENT DOCUMENTS 7,747,749 B1 *  6/2010  Erikson ............... G06F 16/9574
                                                  709/226
9,508,040 B2    11/2016 Bilal et al.
(Continued)

FOREIGN PATENT DOCUMENTS

JP       2002-215278 A    7/2002
KR  10-2005-0025220 A     3/2005

OTHER PUBLICATIONS

International Search Report and Written Opinion dated May 22, 2020 issued by the International Searching Authority in counterpart International Application No. PCT/KR2020/002166 (PCT/ISA/210 and PCT/ISA/237).

*Primary Examiner* — Ryan Barrett
(74) *Attorney, Agent, or Firm* — Sughrue Mion, PLLC

(57) ABSTRACT

A method for machine learning based prediction of at least one subsequent UI layout is provided. The method may include detecting, by the electronic device, a first transition event. Further, the method may include identifying, by the electronic device, a UI layout associated with a first application of the electronic device. Further, the method may include predicting, by the electronic device, the at least one subsequent UI layout to be displayed based on at least one transition parameter, wherein the at least one subsequent UI layout is associated with at least one of the first application or at least one second application. Further, the method may include loading, by the electronic device, the at least one subsequent UI layout in a memory of the electronic device.

16 Claims, 12 Drawing Sheets

(51) Int. Cl.
*G06F 16/908* (2019.01)
*G06F 11/34* (2006.01)

(56) References Cited

U.S. PATENT DOCUMENTS

| | | | |
|---|---|---|---|
| 9,933,861 | B2 | 4/2018 | Wolfram et al. |
| 10,126,903 | B2 | 11/2018 | Peng et al. |
| 10,628,546 | B1* | 4/2020 | Colwell ................ G06F 30/392 |
| 11,048,852 | B1* | 6/2021 | Fallon .................... G06F 30/38 |
| 2004/0030882 | A1 | 2/2004 | Forman |
| 2005/0054381 | A1 | 3/2005 | Lee et al. |
| 2005/0071777 | A1 | 3/2005 | Roessler et al. |
| 2009/0172562 | A1* | 7/2009 | Lai ...................... G06F 3/04817 715/745 |
| 2010/0317371 | A1* | 12/2010 | Westerinen ........... H04W 4/029 455/456.6 |
| 2012/0239598 | A1* | 9/2012 | Cascaval ............... G06F 16/957 706/12 |
| 2013/0159893 | A1 | 6/2013 | Lewin et al. |
| 2013/0212487 | A1* | 8/2013 | Cote ....................... G06F 9/451 715/745 |
| 2014/0306978 | A1 | 10/2014 | Du et al. |
| 2015/0049080 | A1 | 2/2015 | Purayil et al. |
| 2016/0034139 | A1 | 2/2016 | Boneti et al. |
| 2017/0329747 | A1* | 11/2017 | Noursalehi ............ G06N 7/005 |
| 2018/0005146 | A1* | 1/2018 | Chintalapaty ....... G06F 11/3409 |
| 2018/0183891 | A1 | 6/2018 | Zhang et al. |
| 2021/0072871 | A1* | 3/2021 | Li ............................ G06F 3/14 |

\* cited by examiner

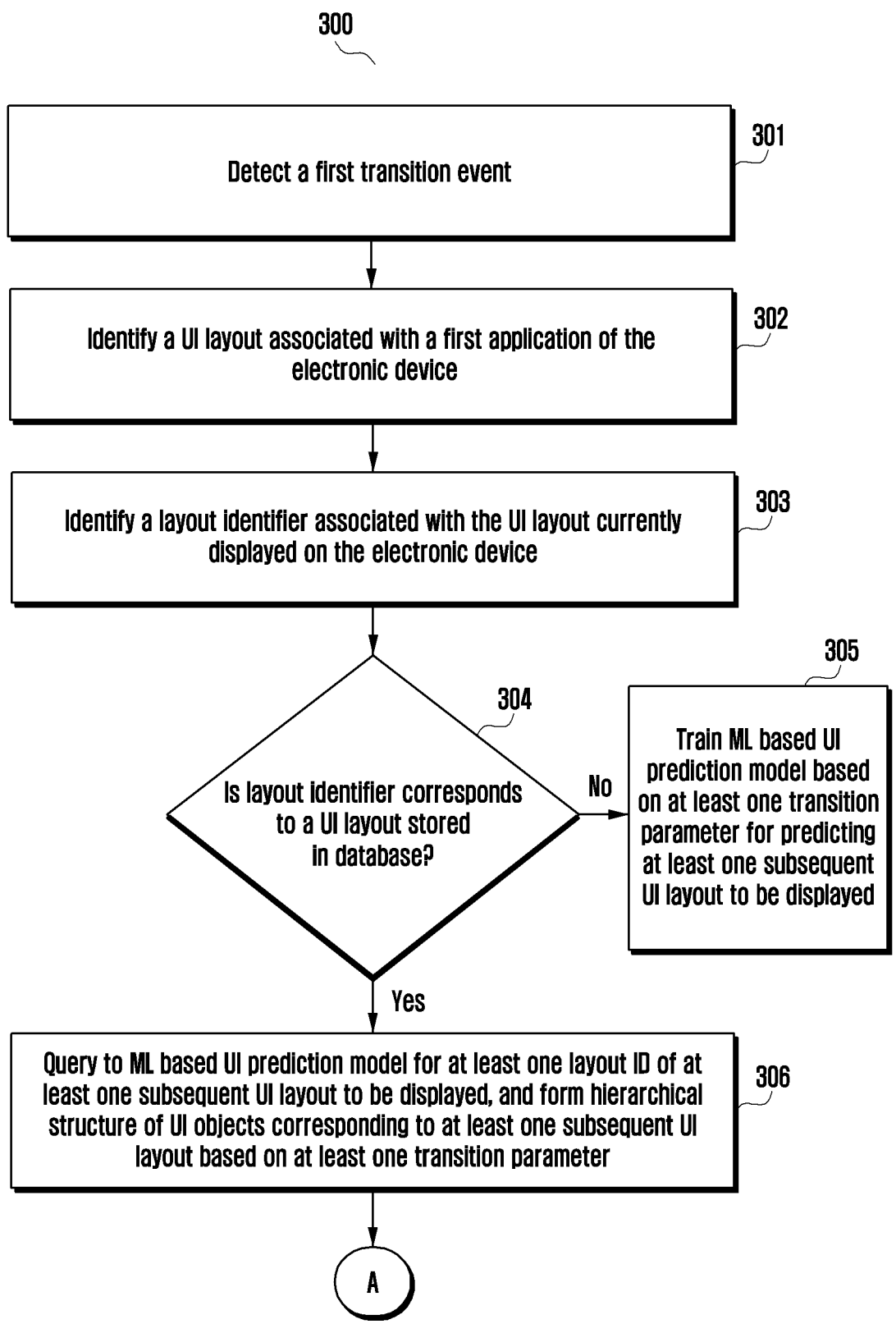

| Memory address | UI object |
|---|---|
| 0FF3 – 0FF6 | Button |
| 0FF7 – 0FFA | Text view |
| 0FFB – 0FFD | Edit text |
| 0FFE – 0FFF | Icons |

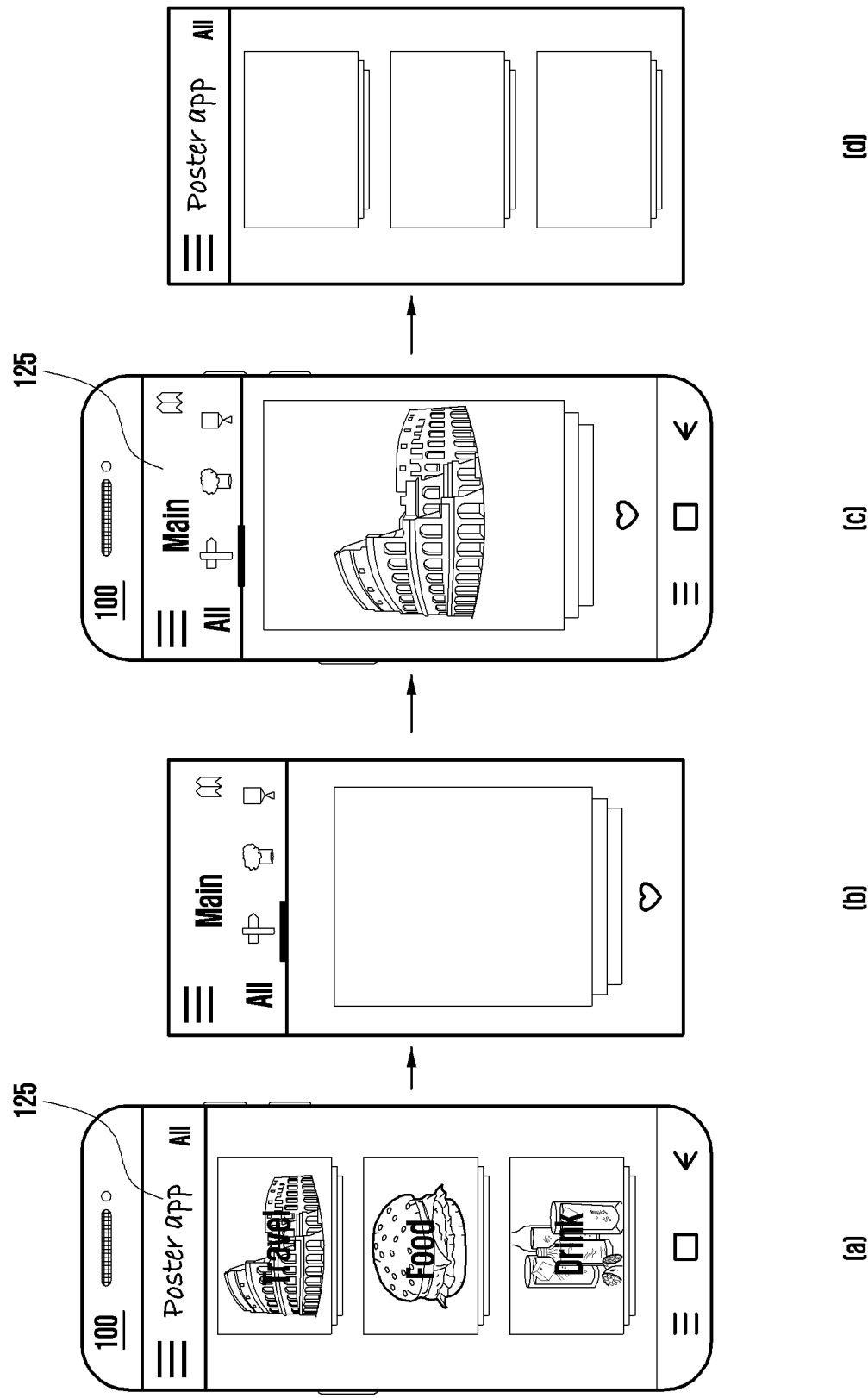

METHOD AND ELECTRONIC DEVICE FOR MACHINE LEARNING BASED PREDICTION OF SUBSEQUENT USER INTERFACE LAYOUTS

CROSS-REFERENCE TO RELATED APPLICATION(S)

This application is based on and claims priority under 35 U.S.C. § 119 to Indian Provisional Patent Application No. 201941006132, filed on Feb. 15, 2019, and to Indian Non-Provisional Patent Application No. 201941006132, filed on Dec. 16, 2019 in the Indian Patent Office, the disclosures of which are herein incorporated by reference their entireties.

FIELD OF INVENTION

The present disclosure relates to electronic devices, and more specifically to a method and electronic device for Machine Learning (ML) based prediction of at least one subsequent User Interface (UI) layout.

BACKGROUND

A User Interface (UI) layout in an operating system (OS), such as, Android®, may contain a blueprint of UI objects of an application installed at an electronic device, such as, a smartphone. An application developer may design the UI layout in a developing stage of the application by declaring each UI widget corresponding to each UI object in an Extensible Mark-up Language (XML) file. The XML file may be packaged within an installation file of the application. A name of the XML file may be represented by a unique integer number, which may be called a Layout Identifier (layout ID). The electronic device may need to inflate each UI layout in runtime for drawing each UI of the application, based on receiving a call from the application for a UI transition.

Examples for the UI transition include, but are not limited to, launching the application, an application activity switching, multi-window operations, changing an application orientation (e.g., rotation), changing a typing language, changing a font, scrolling, a notification bar, a lock screen to a home screen transition, initiating different operations modes (e.g. power saving mode, flight mode, silent mode, etc.), an application switching, composing a message, sharing a file in a gallery application and the like. The electronic device may form an in-memory representation of a hierarchical structure of the UI objects while inflating the UI layout. The electronic device may use an Inflate( ) Application Programming Interface (API) in the OS (e.g., Android) for converting the UI layout defined in the XML file to the hierarchical structure of the objects.

A frame drop may occur at the electronic device based OD the electronic device not inflating the UI layout within an amount of time (e.g., 16 milliseconds (ms)). The electronic device may miss drawing the UI layout based on the frame drop occurring. FIG. 1 is an example scenario illustrating the frame drop which may occur in an electronic device (e.g., a smartphone) during the UI transition. Consider the user is scrolling over the application. A first frame of the UI Includes a first UI object. A second frame of the UI includes the first UI object and a second UI object. A third frame of the UI includes the first UI object, the second UI object and a third UI object. Consider, a time taken by the electronic device to inflate the first UI object, the second UI object and the third UI object is, for example, 10 ms, 20 ms and 7 ms, respectively. At a first instant, the smartphone may inflate the first UI object within 16 ms and draws the first frame. At a second instant, the smartphone missed to draw the second frame due to higher time to inflate the second UI object in the second frame. Further, the smartphone completes the inflation of the second UI object by consuming from the time for inflation of the third UI. At a third instant, the smartphone inflates the third UI object within 16 ms and draws the third frame.

An increased number of frame drops in the application causes a visible stuttering, a lockup, a hang, a degraded application launch performance, etc. for the electronic device, which adversely affects a user experience. Thus, it is desired to address the above mentioned shortcomings or at least provide a useful alternative.

SUMMARY

Accordingly, the embodiments herein provide a method for ML based prediction of at least one subsequent UI layout. The method may include detecting, by the electronic device, a first transition event. Further, the method may include identifying, by the electronic device, a UI layout associated with a first application of the electronic device. Further, the method may include predicting, by the electronic device, the at least one subsequent UI layout to be displayed based on at least one transition parameter, wherein the at least one subsequent UI layout is associated with at least one of the first application and at least one second application. Further, the method may include loading, by the electronic device, the at least one subsequent UI layout in a memory of the electronic device.

In an embodiment, the method may further include detecting, by the electronic device, a second transition event. Further, the method may further include automatically displaying, by the electronic device, the at least one loaded subsequent UI layout from the memory of the electronic device.

In an embodiment, where predicting, by the electronic device, the at least one subsequent UI layout to be displayed based on at least one transition parameter, includes identifying, by the electronic device, a layout Identifier (ID) associated with the UI layout currently displayed on the electronic device, identifying, by the electronic device, whether the layout ID corresponds to a UI layout stored in a database, performing, by the electronic, device, one of querying to a ML based UI prediction model for at least one layout ID of the at least one subsequent UI layout to be displayed, and forming a hierarchical structure of UI objects corresponding to the at least, one subsequent UI layout based on the at least one transition parameter for predicting the at least one subsequent UI layout to be displayed, based on identifying that the layout ID corresponds to the UI layout stored in the database, or training the ML based UI prediction model based on the at least one transition parameter for predicting the at least one subsequent UI layout to be displayed, based on identifying that the layout ID does not correspond to the UI layout stored in the database.

In an embodiment, where the hierarchical structure of the UI objects are formed by identifying a probability in selecting each UI layout based on the at least one transition parameter.

In an embodiment, the ML based UI prediction model is trained by identifying the at least one transition parameter of the UI layout for a session recording the at least one transition parameter of the UI layout to the memory of the electronic device, identifying a probability in selecting the UI layout for each transition event based on the at least one recorded transition parameter, generating the ML based UI prediction model based on the probability of selecting the UI layout for each of the plurality of transition events, and storing the layout ID associated with the UI layout to the database.

In an embodiment, the at least one transition parameter includes one or more of a sequence of selection of each of the plurality of UI layouts, a time of a day at which the respective UI layout is selected, a layout ID, a number of times the respective UI layout is selected, an activity transition type, a session ID and a frame drop count in displaying a selected UI layout.

Accordingly, the embodiments herein provide an electric device for ML based prediction of at least one subsequent UI layout. The electric device may include a memory and a processor, where the processor is coupled to the memory. The processor may be configured to detect a first transition event. Further, the processor may be configured to identify a UI layout associated with a first application of the electronic device. Further, the processor may be configured to predict the at least one subsequent UI layout to be displayed based on at least one transition parameter, wherein the at least one subsequent UI layout may be associated with at least one of the first application and at least one second application. Further, the processor may be configured to load the at least one subsequent UI layout in a memory of the electronic device.

In an embodiment, the processor may be further configured to detect a second transition event. Further, the processor may be configured to automatically display the at least one loaded subsequent UI layout from the memory of the electronic device.

Accordingly, the embodiments herein provide a method that may include: storing information regarding a user's sequence of user interface (UI) transition events; performing Machine Learning (ML) based on the stored information regarding the user's sequence of UI transition events; performing ML based prediction that includes predicting at least one subsequent User Interface (UI) transition event, from among the user's sequence of UI transition events, based on the ML; identifying at least one subsequent UI layout element that corresponds to the predicted at least one subsequent UI transition event; and starting loading, by an electronic device, of the at least one predicted subsequent UI layout element that corresponds to the at least one predicted subsequent UI transition event, prior to the at least one predicted subsequent UI transition event occurring in a same session.

In an embodiment, the method may further include: detecting, by the electronic device, a first transition event; and automatically displaying, by the electronic device, a first UI layout from a memory of the electronic device based on the detecting of the first transition event.

In an embodiment, the method may further include: detecting, by the electronic device, a second transition event, which corresponds to one of the at least one predicted subsequent UI transition events; and automatically displaying, by the electronic device, the at least one loaded subsequent UI layout from a memory of the electronic device based on the detecting of the second transition event.

In an embodiment, the method may further include: wherein the predicting the at least one subsequent UI layout is based on at least one transition parameter, and comprises: identifying, by the electronic device, a layout Identifier (ID) associated with a UI layout currently displayed on the electronic device; identifying, by the electronic device, whether the layout ID corresponds to a UI layout stored in a database; and performing, by the electronic device, one of querying to a ML based UI prediction model for at least one layout ID of the at least one subsequent UI layout, and forming a hierarchical structure of UI objects corresponding to the at least one subsequent UI layout based on the at least one transition parameter for predicting the at least one subsequent UI layout, based on identifying that the layout ID corresponds to the UI layout stored in the database; or training the ML based UI prediction model based on the at least one transition parameter for predicting the at least one subsequent UI layout, based on identifying that the layout ID does not correspond to the UI layout stored in the database.

In an embodiment, the method may further include: wherein the hierarchical structure of the UI objects are formed by identifying a probability in selecting each UI layout based on the at least one transition parameter.

In an embodiment, the method may further include: wherein a ML based UI prediction model is trained by: identifying the at least one transition parameter of the UI layout for the same session; recording the at least one transition parameter of the UI layout to the memory of the electronic device; identifying a probability of selecting the UI layout for each of a plurality of sequences of transition events based on the at least one recorded transition parameter; generating the ML based UI prediction model based on the probability of selecting the UI layout for each of the transition events; and storing the layout ID associated with the UI layout in a database.

In an embodiment, the method may further include: wherein the at least one transition parameter includes one or more of, for each of a plurality of UI layouts: a sequence of selections of the plurality of UI layouts, a time of a day at which the respective UI layout is selected, a layout ID, a number of times the respective UI layout is selected, an activity transition type, a session ID and a frame drop count in displaying a selected UI layout.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method and electronic device is illustrated in the accompanying drawings, throughout which like reference letters indicate corresponding parts in the various figures. The embodiments herein will be better understood from the following description with reference to the drawings, in which:

FIGS. 3A and 3B are a flow diagram illustrating a method for the ML based prediction of the at least one subsequent UI layout by the electronic device, according to an embodiment;

FIG. 6 is a table that illustrates an example scenario of addressing (memory addressing) a UI object at a memory by the electronic device, according to an embodiment;

FIG. 9 illustrates an example scenario of loading the subsequent UI layout and displaying, the subsequent UI layout by the electronic device during each transiting event which occurs at the smartphone, according to an embodiment as disclosed herein.

DETAILED DESCRIPTION

Figure 1:
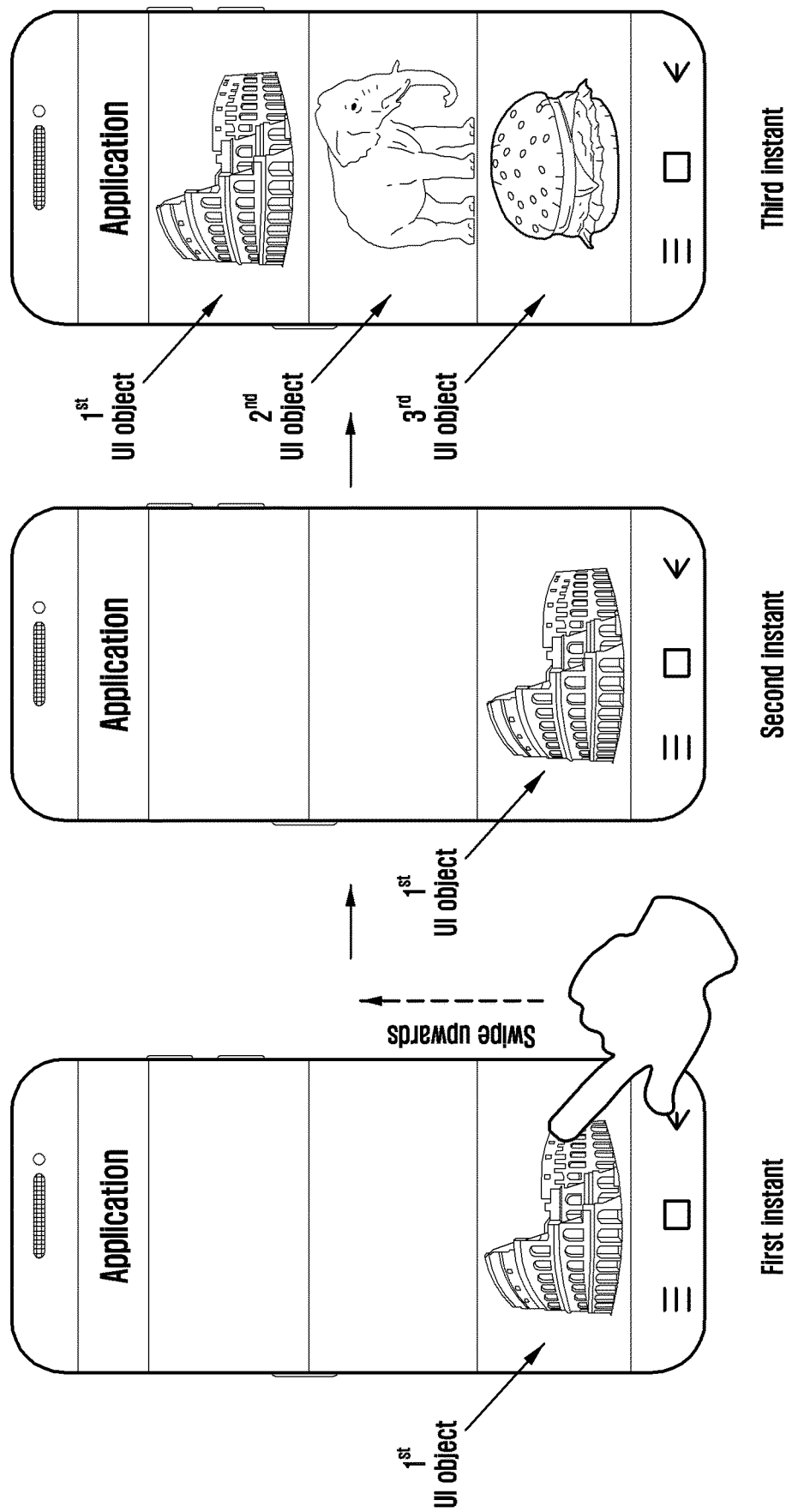
FIG. 1 is an example scenario illustrating a frame drop which occurs in an electronic device during a User Interface (UI) transition, according to a related art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein may provide a method for Machine Learning (ML) based prediction of at least one subsequent User interface (UI) layout. The method may include detecting, by the electronic device, a first transition event. Further, the method may include identifying, by the electronic device, a UI layout associated with a first application of the electronic device. Further, the method may include predicting, by the electronic device, the at least one subsequent UI layout to be displayed based on at least one transition parameter, wherein the at least one subsequent UI layout is associated with at least one of the first application and at least one second application. Further, the method may include loading, by the electronic device, the at least one subsequent UI layout in a memory of the electronic device.

Unlike related methods and systems, the proposed method allows the electronic device to predict each subsequent UI layout to be displayed on for the subsequent transitions based on the at least one transition parameter. Further, the electronic device may pre-inflate the at least one subsequent UI layout before initiating the subsequent UI transitions based an the prediction. The electronic device may load the at least one subsequent UI layout to the cache of the electronic device for pre-inflating the at least one subsequent UI layout. The electronic device may quickly display the at least one subsequent UI layout for subsequent UI layout transitions by indirectly reducing an inflation time to display the at least one subsequent UI layout for the subsequent UI layout transitions. Therefore, the proposed method reduces an occurrence of a frame drop at the electronic device during UI layout transitions, which improves an application launch performance, an in-app switching performance, an in-activity switching performance and app UI rotation performance.

Referring now to the drawings, and more particularly to FIGS. 2 through 9, there are shown preferred embodiments.

Figure 2:
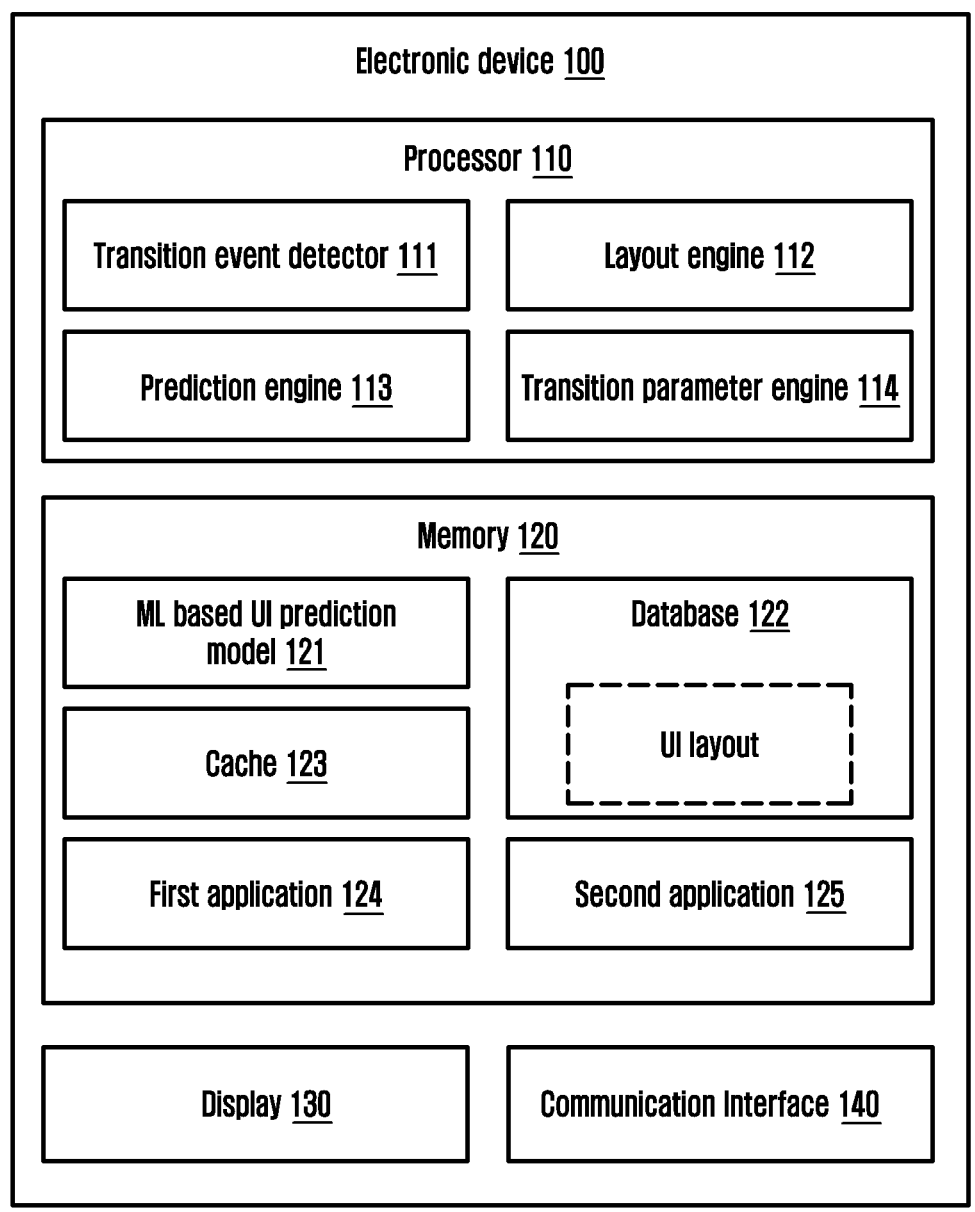
FIG. 2 is a block diagram of an electronic device for Machine Learning (ML) based prediction of at least one subsequent UI layout, according to an embodiment.

FIG. 2 is a block diagram of an electronic device 100 for ML based prediction of at least one subsequent UI layout, according to an embodiment as disclosed herein. Examples for the electronic device 100 are, but not limited to a smart phone, a tablet computer, a personal computer, a desktop computer, a personal digital assistance (PDA), multimedia device, an Internet of Things (IoT) device and the like. In an embodiment, the electronic device 100 includes a processor 110, a memory 120, a display 130 and a communication interface 140. In an embodiment, the processor 110 includes a transition event detector 111, a layout engine 112, a prediction engine 113 and a transition parameter engine 114. The processor 110 may be configured to execute instructions stored in the memory 120.

In an embodiment, the memory 120 may include one or more of a ML based UI prediction model 121, a database 122, a cache 123, a first application 124 and at least one second application 125. The database 122 may store the UI layout of one or more application. Examples for the ML based UI prediction model 121 may be, but are not limited to, a decision tree model, a trie model (i.e. compact prediction tree model), a sequence prediction model, a support vector machine model, a naive bares model, and the like. The memory 120 may include non-volatile storage elements.

Examples of such on-volatile storage elements may include one or more of magnetic hard discs, optical discs, floppy discs, flash memories or forms of an Electrically Programmable Memory (EPROM) or an Electrically Erasable and Programmable Memory (EEPROM).

In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the electronic device 100 can be configured to store larger amounts of information than the memory 120. The memory 120 may store large amounts of Information. In certain examples, a non-transitory storage medium may store data that can, over time, change (e.g., in Random Access Memory (RAM) or cache).

The display 130 may display the UI layouts of the first application and the at least second application 200. Examples for the display 130 may be, but are not limited to a Liquid Crystal Display (LCD), a Light Emitting Diode (LED) and the like. In an embodiment, the display 130 may be a touch screen display which may obtain a touch input from a user for generating a UI transition. In an embodiment, the electronic device 100 obtains a user input (e.g. a touch, a scroll, a swipe or a fling) for generating the UI transition.

The communication interface 140 may be configured to communicate internally between hardware components in the electronic device 100. Further, the communication interface 140 may be configured to facilitate the communication between the electronic device 100 and other electronic devices (not shown).

The processor 110 may be configured to detect a first transition event, where the first transition event is the UI transition occurring at the first application for a first time due to the user input. The transition event detector 111 may detect the first transition event. The transition event detector 111 may detect all transition events occurring at the electronic device 100. The processor 110 may be configured to identify a UI layout associated with the first application 124. The layout engine 112 may identify the UI layout associated with the first application 124, based on the detecting of the first transition event. The processor 110 may be configured to predict the at least one subsequent UI layout to be displayed based on at least one transition parameter. The at least one subsequent UI layout may be associated with at least one of the first application 124 or the at least one second application 125. In an embodiment, the at least one transition parameter may include a sequence of selections of each UI layout, a time of a day at which the UI layout is selected, a layout identifier (ID), a number of times the UI layout is selected, an activity transition type, a session ID and a frame drop count in displaying a selected UI layout. The prediction engine 113 may predict the at least one subsequent UI layout to be displayed based on the at least one transition parameter. In an example scenario, "2130903235" is the layout ID of a UI layout of "settings" in an instant messenger application. The session ID may indicate an application session.

In another embodiment, the processor 110 may be configured to identify a layout Identifier (ID) associated with the UI layout currently displayed on the electronic device 100. The layout engine 112 may identify are layout ID associated with the UI layout currently displayed on the electronic device 100. The processor 110 may be configured to identify whether the layout ID corresponds to a UI layout stored in the database 122. The layout engine 112 identifies whether the layout ID corresponds to the UI layout stored in the database 122.

The processor 110 may be configured to query to the ML based UI prediction model 121 for at least one layout ID of the at least one subsequent UI layout to be displayed, based on identifying that the layout ID corresponds to the UI layout stored in the database 122. The prediction engine 113 may query to the ML based UI prediction model 121 for the at least one layout ID of the at least one subsequent UI layout to be displayed, based on identifying that the layout ID corresponds to the UI layout stored in the database 122. The processor 110 may be configured to form a hierarchical structure of UI objects corresponding to the at least one subsequent UI layout based on the at least one transition parameter. Sparse array is an example for the hierarchical structure of UI objects which is shown in notation (b) of FIG. 5. In an embodiment, the hierarchical structure of the UI objects are formed by identifying a probability in selecting each UI layout based on the at least one transition parameter and arranging the UI objects of each UI layout. The prediction engine 113 may form the hierarchical structure of the UI objects corresponding to the at least one subsequent UI layout based on the at least one transition parameter. The processor 110 may be configured to predict the at least one subsequent UI layout to be displayed. The prediction engine 113 may predict the at least ante subsequent UI layout to be displayed.

In an embodiment, the processor 110 may be configured to train the ML based UI prediction model 121 based on the at least one transition parameter for predicting the at least one subsequent UI layout to be displayed, identifying that the layout ID does not correspond to the UI layout stored in the database 122. In an embodiment, the processor 110 may be configured to identify the at least one transition parameter of the UI layout for a session (i.e. application session). The prediction engine 113 identify the at least one transition parameter of the UI layout for the session. The processor 111 may be configured to record the at least one transition parameter of the UI layout to the memory 120. The prediction engine 113 may record the at least one transition parameter of the UI layout to the memory 120. The processor 110 may be configured to identify the probability in selecting the UI layout for each transition event based on the at least one recorded transition parameter. The prediction engine 113 may identify the probability in selecting the UI layout for each transition event based on the least one recorded transition parameter.

The processor 110 may be configured to generate the ML based UI prediction model 121 based on the probability in selecting the UI layout for each transition event. The prediction engine may generate the ML based UI prediction model 121 based on the probability in selecting the UI layout for each transition event. The processor 110 be configured to store the layout ID associated with the UI layout in the database 122. The memory 120 may store the layout ID associated with the UI layout. In another embodiment, the prediction engine 113 may generate the ML based UI prediction model 121 for each UI layout using the at least one recorded transition parameter of each UI layout. Further, the prediction engine 113 may identify the probability in selecting the UI layout for each transition event using the ML based UI prediction model 121.

The processor 110 may be configured to load the at least one subsequent UI layout in the memory 120. In an embodiment, the layout engine 112 may load the at least one subsequent UI layout in the database 122 to the cache 123 based on the probability of selecting the UI layout for each transition event. In an embodiment, the layout engine 112 may load the at least one subsequent UI layout in the database 122 by pre-inflating the at least one subsequent UI layout to be displayed for a subsequent transition event, where pre-inflation may be a process of inflating probable subsequent UI layouts needs to be display before an actual inflation time of the subsequent UI layouts. In an embodiment, layout engine 112 may load static UI objects available in the UI layout and may place dynamic contents (e.g. pictures, icons) over the static UI objects while drawing the frame of the UI layout.

In an embodiment, the layout engine 112 may discard the at least one loaded subsequent UI layout based on the at least one loaded subsequent UI not being used to display within a pre-defined time (e.g., 1 second).

In an embodiment the layout engine 112 may load the at least one subsequent UI layout by addressing the UI objects of the at least one subsequent UI layout at the cache 123. An example for addressing the UI objects of the at least one subsequent UI layout at the cache 123 is shown in FIG. 6. The processor 110 may be configured to detect a second transition event, where the second transition event is a subsequent UI transition occurs at the first application 124 or the at least one second application 125 after the first transition event. The processor 110 may be configured to automatically display the at least one loaded subsequent UI layout from the memory 120. The display 130 may automatically display the at least one loaded subsequent layout from the memory 120.

In another embodiment, the processor 110 may be configured to fetch a subsequent UI layout to be displayed based on a related methodology, based on the at least one subsequent UI layout in the database 122 not being loaded or the prediction engine 113 wrongly predicting the subsequent UI layout. In an embodiment, the layout engine 112 may fetch the subsequent UI layout to be displayed based on the related methodology (e.g., layoutinflator.inflate( )), based on the at least one subsequent UI layout in the database 122 not being loaded. In an example, the layout engine 112 may call a default inflate( ) for fetching the subsequent UI layout to be displayed. The processor 110 may be configured to display the subsequent UI layout from the database 422. The display 130 may automatically display the at least one loaded subsequent UI layout from the database 122.

Although FIG. 2 shows the hardware components of the electronic device 100, but it is to be understood that other embodiments of the electronic device 100 are not thereon. In other embodiments, the electronic device 100 may include less or more number of components. Further, the labels or names of the components are used only for illustrative purpose and does not limit the scope of the disclosure. One or more components can be combined together to perform a same or a substantially similar function for Mt based prediction of the at least one subsequent UI layout.

Figure 3B:
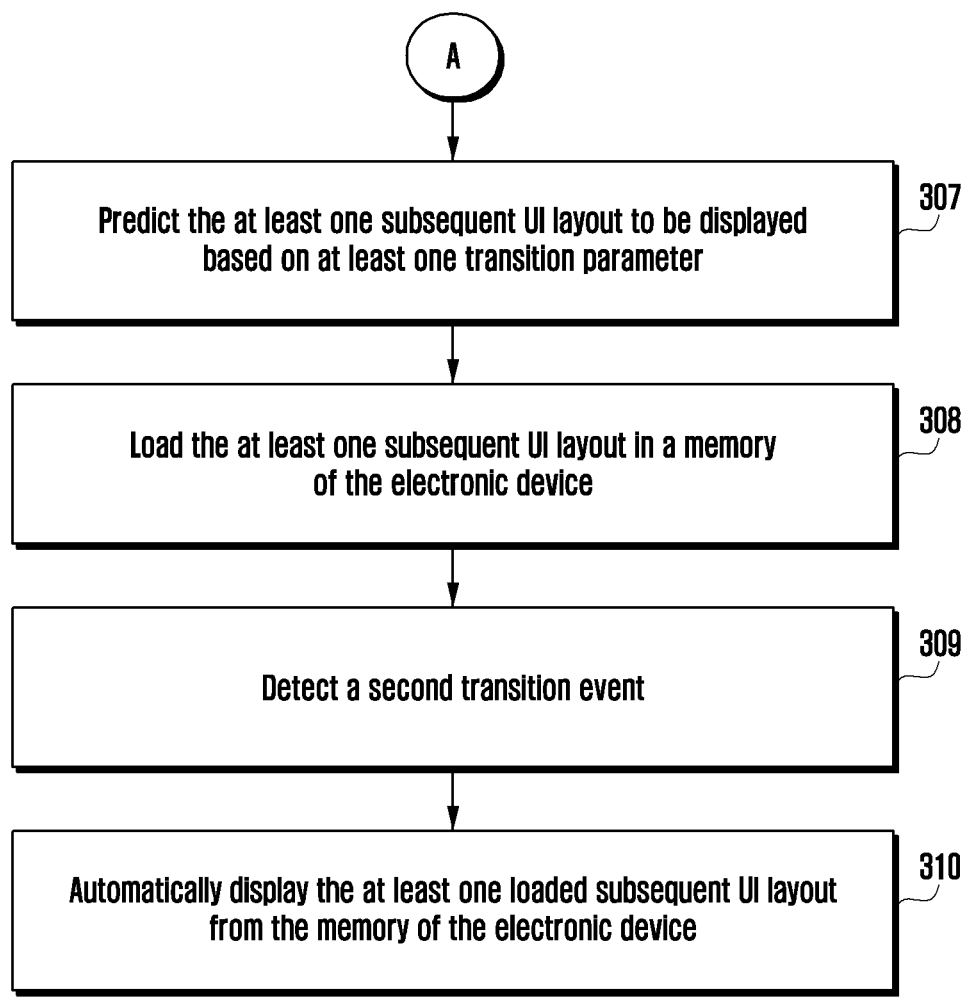

FIGS. 3A and 3B show a flow diagram 300 illustrating a method for the ML based prediction of the at least one subsequent UI layout by the electronic device 100, according to an embodiment as disclosed herein. As shown in FIG. 3A, at 301, the method may include detecting the first transition event. In an embodiment, the method allows the transition event detector 111 to detect the first transition event. At 302, the method includes identifying the UI layout associated with the first application 124 of the electronic device 100. In an embodiment, the method allows the layout engine 112 to identify the UI layout associated with the first application 124 of the electronic device 100. At 303, the method includes identifying the layout identifier associated with the UI layout currently displayed on the electronic device 100. In an embodiment, the method allows the layout engine 112 to identify the layout identifier associated with the UI layout currently displayed on the electronic device 100.

At 304, the method includes identifying whether the layout identifier corresponds to the layout is stored in the database 122. In an embodiment, the method allows the layout engine 112 to identify whether the layout identifier corresponds to the UI layout is stored in the database 122. Based on the layout identifier not corresponding to a UI layout stored in the database (304: NO), at 305, the method may include training the ML based UI prediction model 121 based on the at least one transition parameter for predicting the at least one subsequent UI layout to be displayed. In an embodiment, the method may allow the prediction engine 113 to train the ML based UI prediction model 121 based on the at least one transition parameter for predicting the at least one subsequent UI layout to be displayed. Based on the layout identifier corresponding to a UI layout stored in the database (304: YES), at 306 the method may include querying to the ML based UI prediction model 121 for the at least one layout of the at least one subsequent UI layout to be displayed and forming the hierarchical structure of the UI objects corresponding to the at least one subsequent layout based on the at least one transition parameter. In an embodiment, the method may allow the prediction engine 113 to query to the ML based UI prediction model 121 for the at least one layout ID of the at least one subsequent UI layout to be displayed and form the hierarchical structure of the UI objects corresponding to the at least one subsequent UI layout based on the at least one transition parameter.

As shown in FIG. 3B, at 307, the method may include predicting the at least one subsequent UI layout to be displayed based on the at least one transition parameter. In an embodiment, the method may allow the prediction engine 113 to predict the at least one subsequent UI layout to be displayed based on the at least one transition parameter. At 308, the method may include loading the at least one subsequent UI layout in the memory 120 of the electronic device 100. In an embodiment, the method may allow the layout engine 112 to load the at least one subsequent UI layout in the memory 120 of the electronic device 100. At 309, the method may include detecting the second transition event. In an embodiment, the method may allow the transition event detector 111 to detect the second transition event. At 310, the method may include automatically displaying the at least one loaded subsequent UI layout from the memory 120 of the electronic device 100. In an embodiment, the method may allow the display 130 to automatically display the at least one loaded subsequent UI layout from the memory 120 of the electronic device 100.

The various actions, acts, blocks, steps, or the like in the flow diagram 300 may be performed in the order presented, in different order or simultaneously. Further, in some embodiments, some of the actions, acts, blocks, steps, or the like may be omitted, added, modified, skipped, or the like without departing from the scope of the invention.

Figure 4:
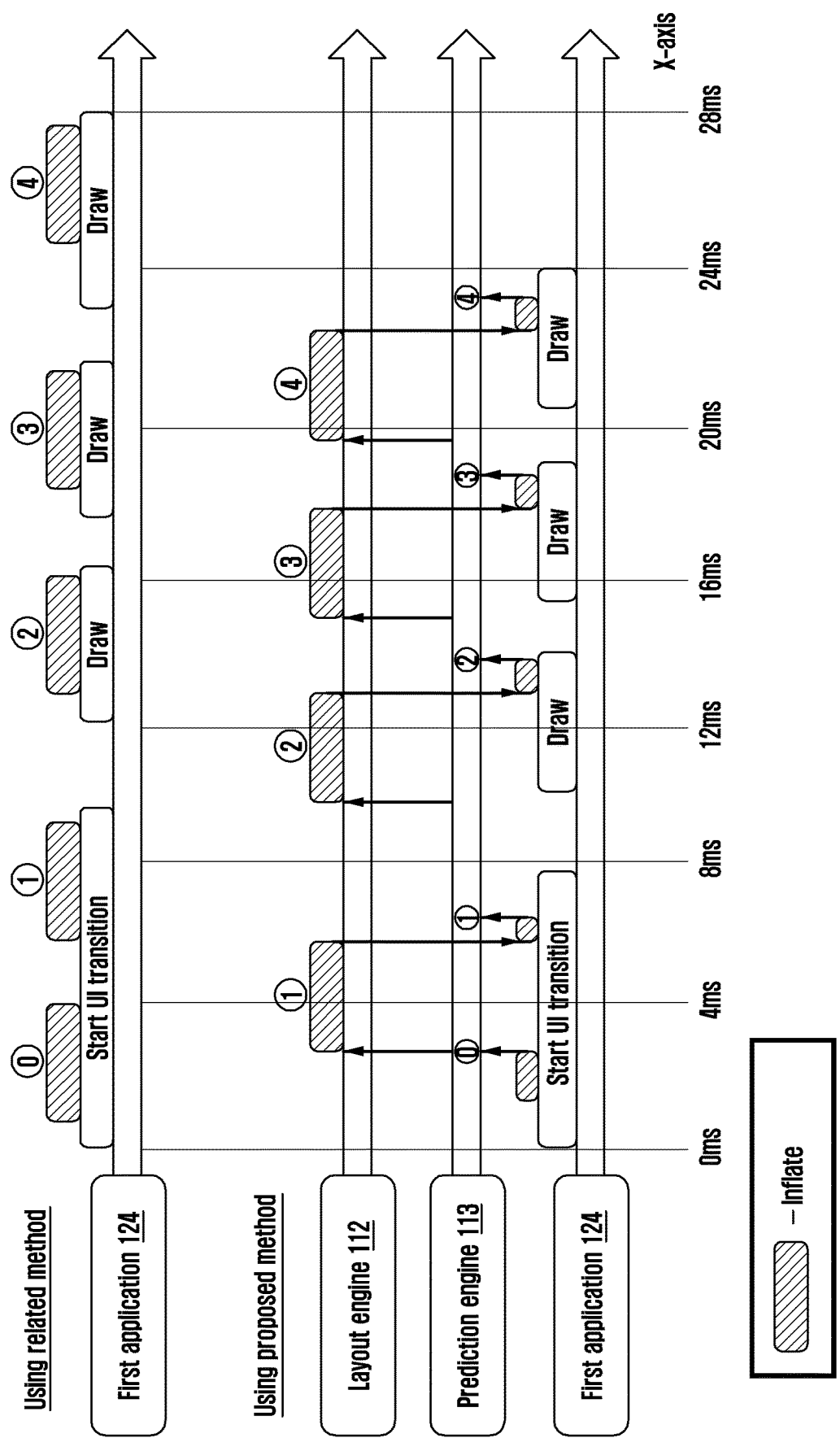
FIG. 4 illustrates a comparison of time consumption by the electronic device using the proposed method and a conventional method to draw the UI objects by a first application of the electronic device, according to an embodiment.

FIG. 4 illustrates a comparison of time consumption by the electronic device 100 using the proposed method and a related method to draw the UI objects by the first application 124 of the electronic device 100 in an example scenario, according to an embodiment as disclosed herein. The time taken by the first application 124 to complete a start UI transition event and four draw operations associated with the UI transition is plotted in an X-axis of the FIG. 4. The related method allows the electronic device 100 to inflate the UI layouts 0 and 1 using the first application 124 after detecting the start UI transition event. Further, the related method allows the electronic device 100 to inflate the UI layouts 2, 3 and 4 using the first application 124 after detecting draw events for performing the draw operations. Therefore, the first application 124 consumes 28 ms to complete the start UI transition event and the four draw operations associated with the UI transition based on the related method in the example scenario.

The proposed method, according to an embodiment, may allow the electronic device 100 to pre-inflate the UI layouts (0, 1, 2, 3 and 4) using the layout engine 112 after detecting the start UI transition event. Consider, the first application 124 may detect the start UI transition event. Further, the first application 124 may inflate the UI layout 0 (e.g., based on detecting the start UI transition event). The prediction engine 113 may predict the UI layout 1 to pre-inflate after detecting inflation of the UI layout 0. Further, the layout engine 112 may inflate the UI layout 1 and may load the inflated layout 1 to the cache 123 from the database 122 prior to receiving a trigger to inflate the UI layout 1. While receiving the trigger to inflate the UI layout 1 by the first application 124, the layout engine 112 may configure the cache 123 to provide the inflated UI layout 1 to the first application 124. Therefore, the first application 124 may quickly complete the start UI transition event without consuming the time to inflate the UI layout 1.

Similarly, the prediction engine 113 may predict the UI layout 2 to pre-inflate after completing the start UI transition event. Further, the layout engine 112 may inflate the UI layout 2 and may load the inflated UI layout 2 to the cache 123 from the database 122, prior to receive the trigger to inflate the UI layout 2. While receiving the trigger to inflate the UI layout 2 by the first application 124, the layout engine 112 may configure the cache 123 to provide the inflated UI layout 1 to the first application 124. Therefore, the first application 124 can quickly complete the draw operation of the UI layout 2 without consuming the time to inflate the UI layout 2. Similarly, the first application 124 may quickly complete the draw operation of the UI layout 3 without consuming the time to inflate the UI layout 3 after completing the draw operation of the UI layout 2. Similarly, the first application 124 may quickly complete the draw operation of the UI layout 4 without consuming the time to inflate the UI layout 4 after completing the draw operation of the UI layout 3. Therefore, the first application 124 may consume 24 ms to complete the start UI transition event and the four draw operations associated with UI transition based on the proposed method in the example scenario.

Figure 5:
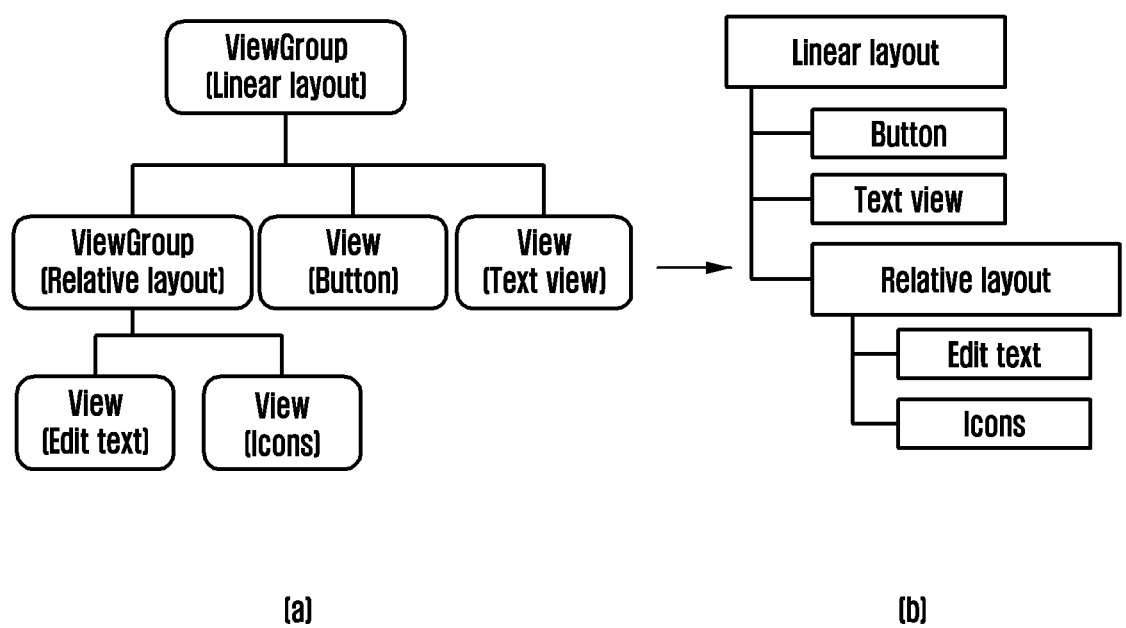
FIG. 5 is an example scenario illustrating an arrangement of the UI objects of the UI layout in a hierarchical structure, according to an embodiment.

FIG. 5 is an example scenario illustrating an arrangement of the UI objects of the UI layout in the hierarchical structure, according to an embodiment as disclosed herein. In the example scenario, an inflated structure of the UI objects of the UI layout is shown in notation (a) of the FIG. 5. "Button" and "Text view" are the UI objects that should be displayed in a linear layout of the UI layout. "Edit text" and "Icons" are the UI objects that should be displayed in a relative layout of the UI layout. The UI objects may be arranged using a sparse array hierarchical structure, as shown in, for example, notation (b) of the FIG. 5.

FIG. 6 illustrates table showing an example scenario of addressing (memory addressing) the UI objects at the memory 120 by the electronic device 100, according to an embodiment as disclosed herein. In the example scenario, the memory address of the UI objects "Button", "Text view", "Edit text", and "Icons" may be given, as shown in, for example, the FIG. 6. The memory address of the UI objects may be represented by combination of numbers, characters and bitmaps.

Figure 7:
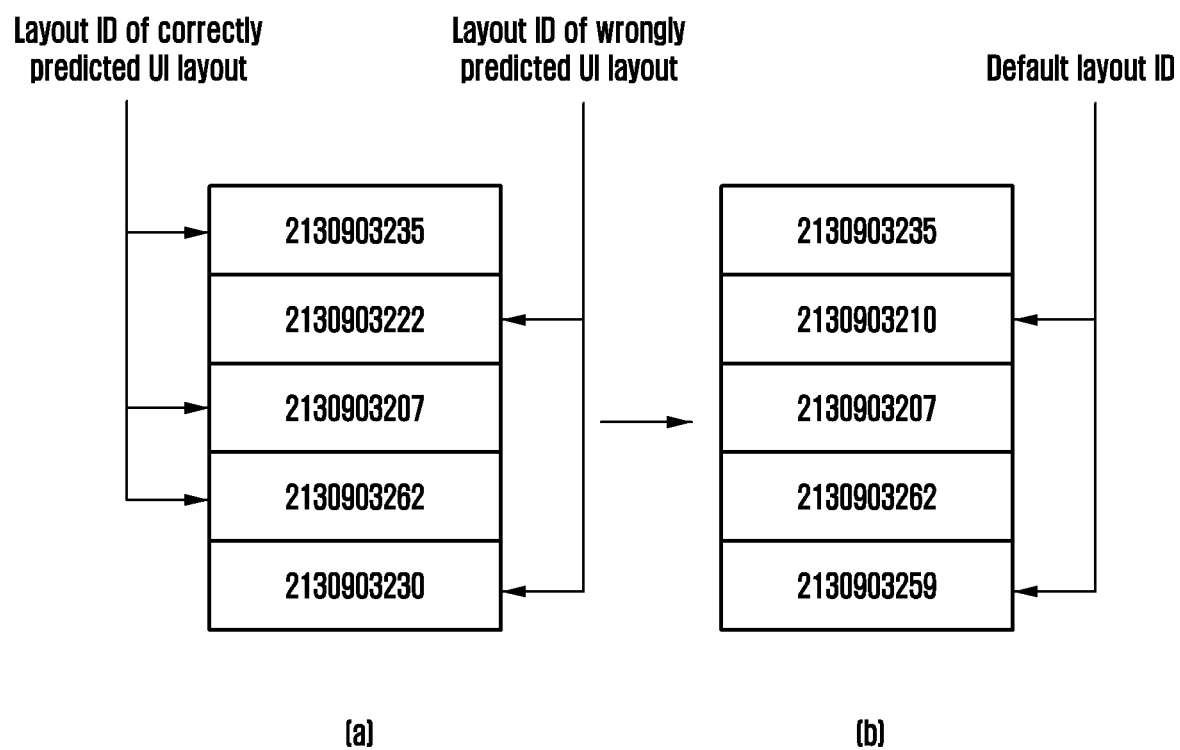
FIG. 7 is an example scenario of managing a layout ID of a wrongly predicted UI layout by the electronic device, according to an embodiment.

FIG. 7 shows an example scenario of managing the layout ID of a wrongly predicted UI layout by the electronic device 100, according to an embodiment as disclosed herein. In the example scenario, the layout IDs of the first application 124 include 2130903235, 2130903222, 2130903207, 2130903262, 2130903230, 2130903210 and 2130903259. Consider, the electronic device 100 predicts the layout IDs in the order 130903235, 2130903222, 2130903207, 2130903262, and 2130903230 and loads corresponding UI layouts to the cache 123 to display in the same order as order as shown in notation (b) of the FIG. 7.

2130903210 and 2130903259 are default layout IDs to be inflated based on the related methodologies for second and fourth transition events of the UI transitions. Consider, the layout IDs 2130903222 and the 2130903230 are wrongly predicted by the electronic device 100, where the user performs an incorrect UI transition on the second and fourth transition events of the UI transitions. The electronic device 100 may provide the default layout IDs 2130903210 and 2130903259 instead of 2130903222 and the 2130903230 respectively to inflate based on the related methodologies, based on detecting that the user performs the incorrect UI transition on the second transition event and the fourth transition event of the UI transitions.

In following example scenarios, a smartphone may be used as the electronic device 100, a setting app may be used as the first application 124, a poster app may be used as the second application 125 and the trie model may be used as the ML based UI prediction model 121.

Figure 8A:
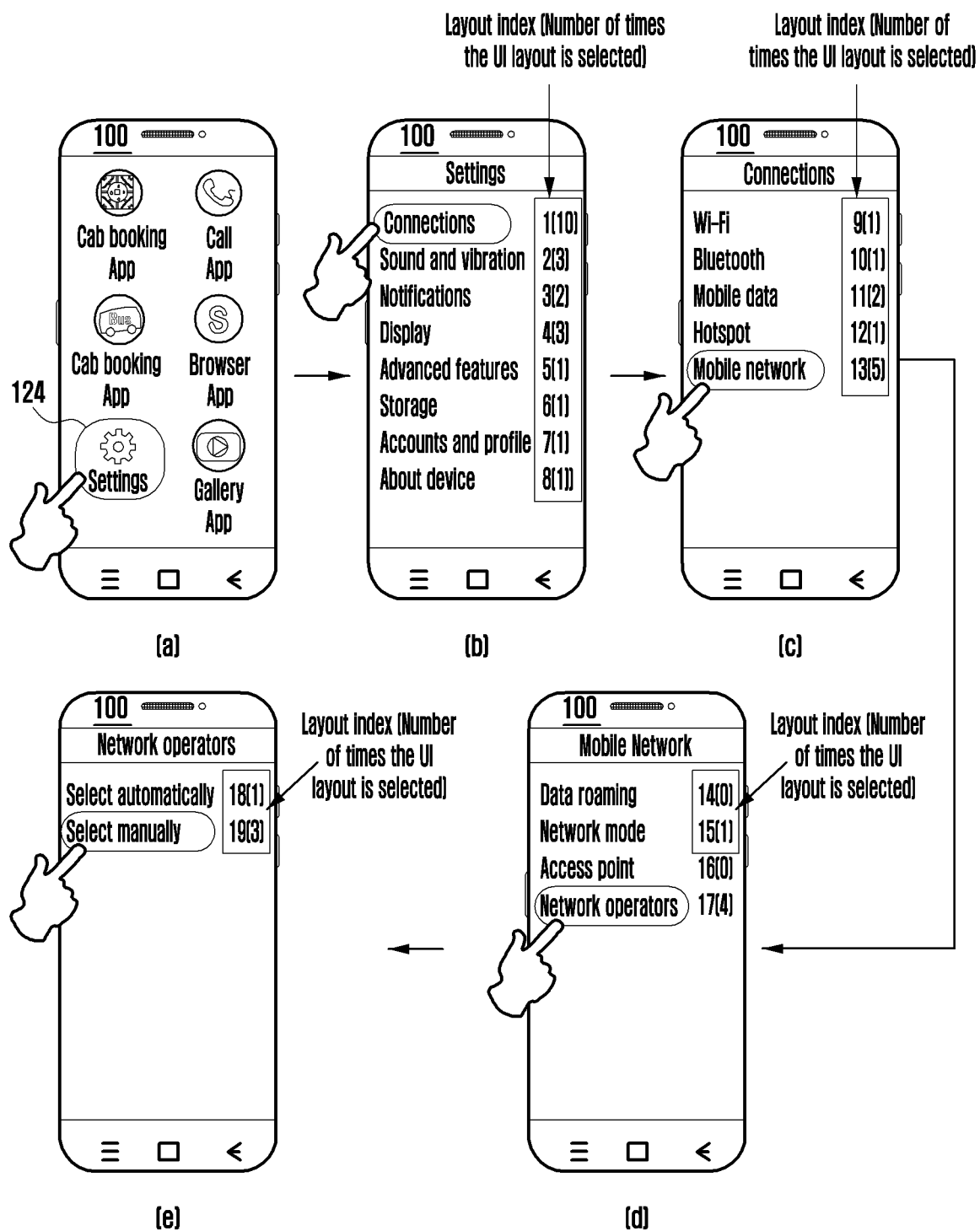
FIG. 8A illustrates an example scenario of identifying by the electronic device a number of times each UI layout is selected while transition events occur in the electronic device, according to an embodiment.

FIG. 8A illustrates an example scenario of identifying, by the electronic device (e.g., smartphone) 100, the number of times each UI layout is selected while the transition events occur in the electronic device (e.g., smartphone) 100, according to an embodiment as disclosed herein. Consider, the electronic device (e.g., smartphone) 100 includes the settings app 124. The UI layout of settings app 124 may include one or more of the UI following objects "Connections, Sound and vibration, Notifications, Display, Advanced features, Storage, Accounts and profile, About device". The UI layout of "Connections" may include one or more of the UI objects "Wi-Fi, Bluetooth, Mobile data, Hotspot, Mobile network". The UI layout of "Mobile network" may include one or more of the UI objects "Data roaming, Network mode, Access point, Network operators". The UI layout of "Network operators" may include one or more of the UI objects "Select automatically, Select manually". The electronic device (e.g., smartphone) 100 may index the UI layout(s) corresponding to one or more of the objects "Connections, Sound and vibration, Notifications, Display, Advanced features, Storage, Accounts and profile, About device, Wi-Fi, Bluetooth, Mobile data, Hotspot, Mobile network, Data roaming, Network mode, Access point, Network operators, Select automatically, Select manually" with one or more of layout index values 1, 2, 3, 4, 5, 6, 7, 8, 9, 10, 11, 12, 13, 14, 15, 16, 17, 18 and 19, respectively.

Consider, the user has opened the settings app 124 in the smartphone 100 for 21 times and selected the UI objects in the "settings" UI layout, the "Connections" UI layout, the "Mobile network" UI layout and the "Network operators" UI layout. The user has selected the UI objects "Connections, Sound and vibration, Notifications, Display, Advanced features, Storage, Accounts and profile, About device" 9, 3, 2, 3, 1, 1, 1, and 1 times, respectively. The user has selected the UI objects "Wi-Fi, Bluetooth, Mobile data, Hotspot, Mobile network" 1, 1, 2, 1, and 4 times, respectively. For example, the user has selected the UI objects "Data roaming, Network mode, Access point, Network operators" 0, 1, 0, and 3 times, respectively. The user has selected the UI objects "Select automatically, Select manually" 1, and 2 times, respectively. The electronic device (e.g., smartphone) 100 may identity the layout ID of the settings app 124 and may index the layout ID of the settings app 124 as a root. The electronic device (e.g., smartphone) 100 may identify the sequence of selection of each UI layout in each session. Further, the smartphone 100 may identify the layout ID as 21. Further, the electronic device (e.g., smartphone) 100 may identify the number of times the UI layout is selected by the user.

Consider, as an example, the user opens the settings app 124 for a 22nd time as shown in notation (a) of the FIG. 8A. The electronic device (e.g., smartphone) 100 may update the session ID as 22. Consider, the user selects the UI object "Connections". The smartphone 100 may update the number of times the "Connections" UI layout is selected by the user to 10 as shown in notation (b) of the FIG. 8A. Consider, the user selects the UI object "Mobile network". The smartphone 100 may update the number of times the "Mobile network" UI layout is selected by the user to 5 as shown in notation (c) of the FIG. 8A. Consider, the user selects the UI object "Network operators". The smartphone 100 may update the number of times the "Network operators" UI layout is selected by the user to 4 as shown in notation (d) of the FIG. 8A. Consider, the user select the UI object "Select manually". The smartphone 100 may update the number of times the "Select manually" UI layout is selected by the riser to 3 as shown in notation (e) of the FIG. 8A.

Figure 8B:
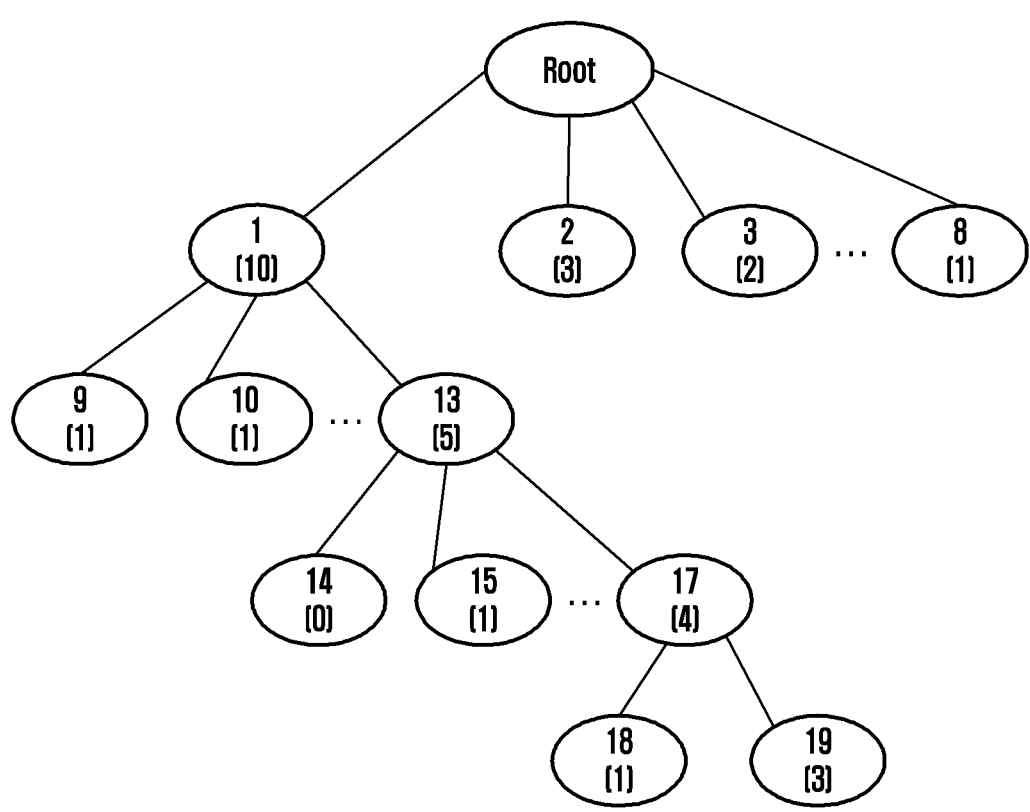
FIG. 8B illustrates an example scenario of generating a trie model using a layout index of each UI layout by the electronic device for predicting the subsequent UI layout according to an embodiment.

FIG. 8B illustrates an example scenario of generating the trie model 121 using the layout index of each UI layout by the electronic device (e.g., smartphone) 100 for predicting the subsequent UI layout, according to an embodiment as disclosed herein. The electronic device (e.g., smartphone) 100 may generate the trie model 121 by creating a node using each layout index and the number of times each UI layout is selected. Further, the electronic device (smartphone) 100 may link the nodes to each other based on a relationship between the layout indexes of each UI layout for generating the trie model 121.

Figure 8C:
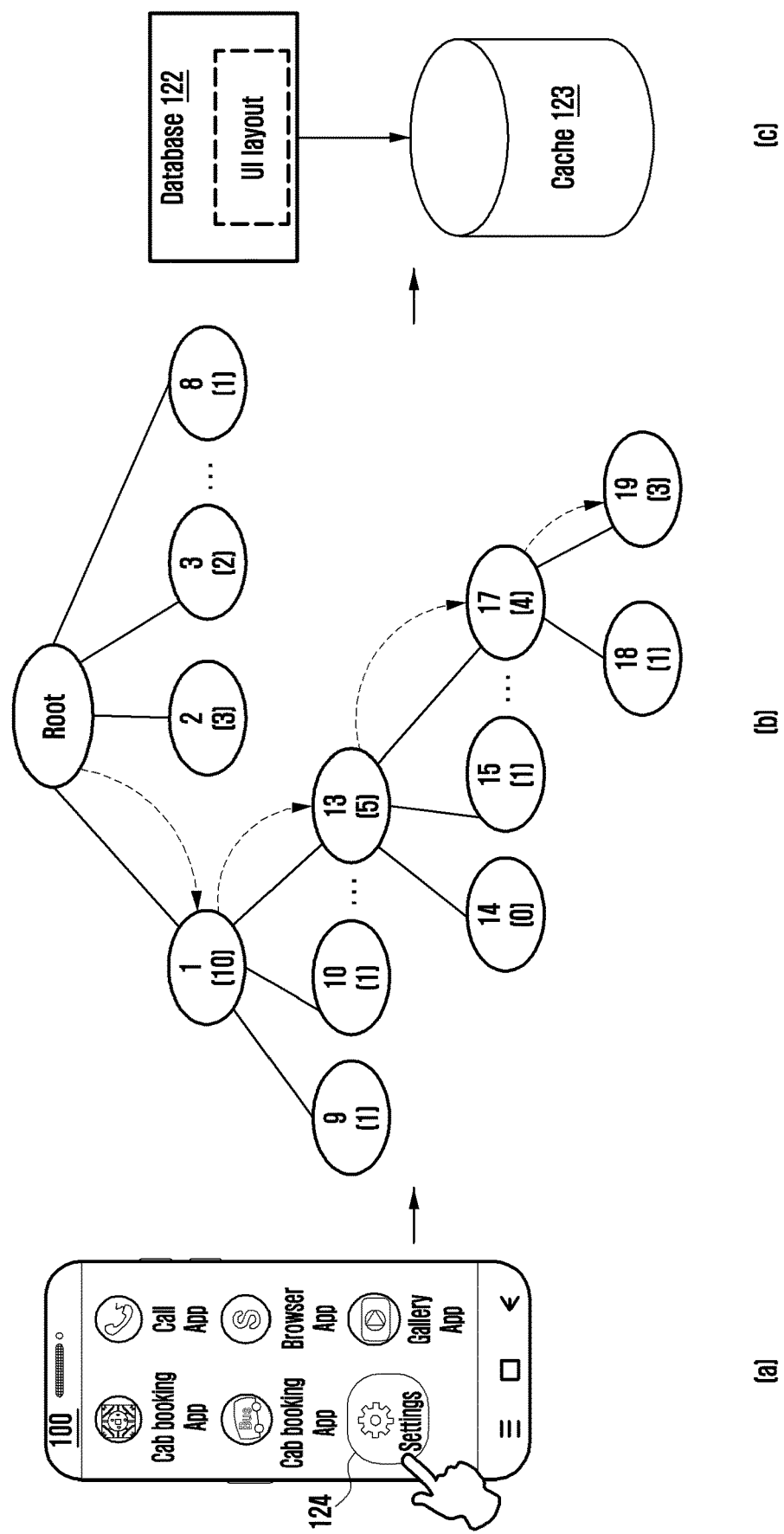
FIG. 8C illustrates an example scenario of predicting and loading the subsequent UI layout by the electronic device to display the subsequent UI layout according to an embodiment.

FIG. 8C illustrates an example scenario of predicting and loading the subsequent UI layout by the electronic device (e.g., smartphone) 100 to display the subsequent UI layout, according to an embodiment as disclosed herein. In the example scenario, consider the user selects on the settings app 124 for $23^{rd}$ time to launch the settings app 124 as shown in notation (a) of the FIG. 8C. The smartphone 100 may display/show the "settings" UI to the user. The electronic device (e.g., smartphone) 100 may detect the first transition event, based on selecting the settings app 124 by the user. Further, the electronic device (e.g., smartphone) 100 may identify that the "settings" UI layout is displayed/ showing to the user. Further, the electronic device (e.g., smartphone) 100 may perform querying to the trie model 121 for the layout index of the subsequent UI layouts to be displayed.

Further, the electronic device (e.g., smartphone) 100 may identify the probability in selecting the UI layout for each transition event based on the number of times the UI layout is selected as shown in notation (b) of the FIG. 8C. The electronic device (e.g., smartphone) 100 may predict that the user will select the UI layout indexed with 1 for a second UI transition. The electronic device (e.g., smartphone) 100 may predict that the user will select the UI layout indexed with 13 for a third UI transition. The electronic device (e.g., smartphone) 100 may predict that the user will select the UI layout indexed with 17 for a third UI transition. The electronic device (e.g., smartphone) 100 may predict that the user will select the UI layout indexed with 19 for a fourth UI transition. Further, the electronic device (e.g., smartphone) 100 may pre-inflate the subsequent UI layout by loading the subsequent UI layout from the database 122 of the electronic device (e.g., smartphone) 100 to the cache 123 of the electronic device (e.g., smartphone) 100 based on the prediction as shown in notation (c) of the FIG. 8C.

FIG. 9 illustrates an example scenario of loading the subsequent UI layout and displaying the subsequent UI layout by the electronic device (e.g., smartphone) 100 during each transiting event which occurs at the electronic device (e.g., smartphone) 100, according to an embodiment as disclosed herein. Consider, the UI layout shown in notation (d) is a first UI layout of the poster app 125 and the UI layout shown notation (b) is a second UI layout of the poster app 125. Consider, the electronic device (e.g., smartphone) 100 is displaying the UI of the poster app 125, which includes static UI objects of the second tai layout and dynamic objects, to the user as shown in notation (a) of the FIG. 9. As shown in FIG. 9, examples for the dynamic UI objects may be pictures of pictures of colosseum, burger, cool drinks and texts "Travel, "Food" "Drinks". The electronic device (e.g., smartphone) 100 may predict and may pre-inflate the first UI layout to be displayed for the subsequent UI transition based on the transition parameters. The electronic device (e.g., smartphone) 100 may display the picture of colosseum and the UI objects of the first UI layout as shown in notation (c) of the FIG. 9 without a frame drop, based on the user selection of the picture of colosseum or the text "Travel". Further, the electronic device (e.g., smartphone) 100 may predict and may pre-inflate the second UI layout to be displayed for the subsequent UI transition based the transition parameter(s).

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or or adapt for various applications sue specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

ADVANTAGES

As non-limiting examples, the disclosed one or more embodiments may provide the following potential advantages.

For example, an advantage of an embodiments is to provide a method and electronic device for ML based prediction of at least, one subsequent UI layout, where the at least one subsequent UI layout is associated with applications in the electronic device.

Another aspect of the embodiments herein is to identify at least one transition parameter of each UI layout.

Another aspect of the embodiments herein is to predict the at least one subsequent UI layout to be displayed for each subsequent UI layout transitions after a first UI layout transition based on at least one transition parameter.

Another aspect of the embodiments herein is to inflate the at least one subsequent UI layout of the application in the electronic device by loading the least one subsequent UI layout of the application at the memory of the electronic device before detecting the subsequent UI layout transitions.

Another aspect of the embodiments herein is to display the at least one loaded subsequent UI layout without creating a frame drop.

Another aspect of the embodiments herein is to improve a performance of the electronic device in application launch, an application activity switching, an application switching and changing an application orientation.

We claim:

1. A method for loading at least one subsequent User interface (UI) layout by an electronic device, the method comprising:
   detecting, by the electronic device, a first transition event;
   identifying, by the electronic device, a UI layout associated with a first application of the electronic device based on the first transition event;
   predicting, by the electronic device, the at least one subsequent UI layout to be displayed based on at least one transition parameter, wherein the at least one subsequent UI layout is associated with the first application or at least one second application; and
   loading, by the electronic device, the at least one subsequent UI layout in a memory of the electronic device,
   wherein the at least one transition parameter includes a sequence of selection of each UI layout, a time of a day at which the UI layout is selected, a layout Identifier (ID), a number of times the UI layout is selected, an activity transition type, a session ID and a frame drop count in displaying a selected UI layout.

2. The method as claimed in claim 1, further comprises:
   detecting, by the electronic device, a second transition event; and
   automatically displaying, by the electronic device, the at least one loaded subsequent UI layout from the memory of the electronic device.

3. The method as claimed in claim 1, wherein the predicting, by the electronic device, the at least one subsequent UI layout to be displayed based on the at least one transition parameter, comprises:
   identifying, by the electronic device, a layout Identifier (ID) associated with the UI layout currently displayed on the electronic device;
   identifying, by the electronic device, whether the layout ID associated with the UI layout corresponds to a UI layout stored in a database;
   performing, by the electronic device, one of:
   querying to a Machine Learning (ML) based UI prediction model for at least one layout ID of the at least one subsequent UI layout to be displayed, and forming a hierarchical structure of UI objects corresponding to the at least one subsequent UI layout based on the at least one transition parameter far predicting the at least one subsequent UI layout to be displayed, based on identifying that the layout ID associated with the UI layout corresponds to the UI layout stored in the database; and
   training the ML based UI prediction model based on the at least one transition parameter for predicting the at least one subsequent UI layout to be displayed, based on identifying that the layout ID associated with the UI layout does not correspond to the UI layout stored in the database.

4. The method as claimed in claim 3, wherein the hierarchical structure of the UI objects is formed by identifying a probability in selecting each UI layout based on the at least one transition parameter.

5. The method as claimed in claim 3, wherein the ML based UI prediction model is trained by:
   identifying the at least one transition parameter of the UI layout for a session;
   recording the at least one transition parameter of the UI layout to the memory of the electronic device;
   identifying a probability of selecting the UI layout for each of a plurality of transition events based on the at least one recorded transition parameter;
   generating the ML based UI prediction model based on the probability of selecting the UI layout for each of the plurality of transition events; and
   storing the layout ID associated with the UI layout to the database.

6. An electronic device for loading at least one subsequent User Interface (UI) layout, the electronic device comprising:
   a memory; and
   a processor, coupled to the memory, configured to:
   detect a first transition event;
   identify a UI layout associated with a first application of the electronic device;
   predict the at least one subsequent UI layout to be displayed based on at least one transition parameter, wherein the at least one subsequent UI layout is associated with the first application and at least one second application; and
   load the at least one subsequent UI layout in the memory of the electronic device,
   wherein the at least one transition parameter includes a sequence of selection of each UI layout, a time of a day at which the UI layout is selected, a layout Identifier (ID), a number of times the UI layout is selected, an activity transition type, a session ID and a frame drop count in displaying a selected UI layout.

7. The electronic device as claimed in claim 6, wherein the processor is further configured to:
   detect a second transition event; and
   automatically display the at least one loaded subsequent UI layout from the memory of the electronic device.

8. The electronic device as claimed in claim 6, wherein the predicting of the at least one subsequent UI layout to be displayed based on the at least one transition parameter, comprises:
   identifying a layout Identifier (ID) associated with the UI layout currently displayed on the electronic device;
   identifying whether the layout ID associated with the UI layout corresponds to a UI layout stored in a database; and
   performing one of:
   querying to a Machine Learning (ML) based UI prediction model for at least one layout ID of the at least one subsequent UI layout to be displayed, and forming a hierarchical structure of UI objects corresponding to the at least one subsequent UI layout based on the at least one transition parameter for predicting the at least one subsequent UI layout to be displayed; based on identifying that the layout ID associated with the UI layout corresponds to the UI layout stored in the database; or training the ML based UI prediction model based on the at least one transition parameter for predicting the at least one subsequent UI layout to be displayed, based on identifying that the layout ID associated with the UI layout does not correspond to the UI layout stored in the database.

9. The electronic device as claimed in claim 8, wherein the hierarchical structure of the UI objects is formed by identifying a probability in selecting each UI layout based on the at least one transition parameter.

10. The electronic device as claimed in claim 8, wherein the ML based UI prediction model is trained by:
identifying the at least one transition parameter of the UI layout for a session;
recording the at least one transition parameter of the UI layout to the memory of the electronic device;
identifying a probability in selecting the UI layout for each of a plurality of transition events based on the at least one recorded transition parameter;
generating the ML based UI prediction model based on the probability in selecting the UI layout for each of the transition events; and
storing the layout ID associated with the UI layout to the database.

11. A method comprising:
storing information regarding a user's sequence of user interface (UI) transition events;
performing Machine Learning (ML) based on the stored information regarding the user's sequence of UI transition events;
performing ML based prediction that includes predicting at least one subsequent User Interface (UI) transition event, from among the user's sequence of UI transition events, based on the ML;
identifying at least one subsequent UI layout that corresponds to the at least one predicted subsequent UI transition event based on at least one transition parameter; and
starting loading, by an electronic device, of the at least one subsequent UI layout that corresponds to the at least one predicted subsequent UI transition event, prior to the at least one predicted subsequent UI transition event occurring in a same session,
wherein the at least one transition parameter includes a sequence of selection of each UI layout, a time of a day at which the UI layout is selected, a layout Identifier (ID), a number of times the UI layout is selected, an activity transition type, a session ID and a frame drop count in displaying a selected UI layout.

12. The method as claimed in claim 11, further comprising:
detecting, by the electronic device, a first transition event; and
automatically displaying, by the electronic device, a first UI layout from a memory of the electronic device based on the detecting of the first transition event.

13. The method as claimed in claim 12, further comprising:
detecting, by the electronic device, a second transition event, which corresponds to one of the at least one predicted subsequent UI transition event; and
automatically displaying, by the electronic device, the at least one loaded subsequent UI layout from a memory of the electronic device based on the detecting of the second transition event.

14. The method as claimed in claim 11, wherein the identifying the at least one subsequent UI layout comprises:
identifying, by the electronic device, a layout identifier (ID) associated with a UI layout currently displayed on the electronic device;
identifying, by the electronic device, whether the layout ID associated with the UI layout corresponds to a UI layout stored in a database; and
performing, by the electronic device, one of:
querying to a ML based UI prediction Model for at least one layout ID of the at least one subsequent UI layout and forming a hierarchical structure of UI objects corresponding to the at least one subsequent UI layout based on the at least one transition parameter for predicting the at least one subsequent UI layout, based on identifying that the layout ID associated with a UI layout corresponds to the UI layout stored in the database; or
training the ML based UI prediction model based on the at least one transition parameter for predicting the at least one subsequent UI layout, based on identifying that the layout ID associated with a UI layout does not correspond to the UI layout stored in the database.

15. The method as claimed in claim 14, wherein the hierarchical structure of the UI objects is formed by identifying a probability in selecting each UI layout based on the at least one transition parameter.

16. The method as claimed in claim 11, wherein the ML based UI prediction model is trained by:
identifying the at least one transition parameter of the UI layout for the same session;
recording the at least one transition parameter of the UI layout to a memory of the electronic device;
identifying a probability of selecting the UI layout for each of a plurality of sequences of transition events based on the at least one recorded transition parameter;
generating the ML based UI prediction model based on the probability of selecting the UI layout for each of the transition events; and
storing the layout ID associated with the UI layout in a database.

* * * * *